(12) United States Patent
Milliken et al.

(10) Patent No.: US 7,163,759 B2
(45) Date of Patent: *Jan. 16, 2007

(54) SOLID OXIDE FUEL CELL STACK ASSEMBLY HAVING TAPERED DIFFUSION LAYERS

(75) Inventors: Christopher E. Milliken, Highland Heights, OH (US); Michael A. Petrik, Highland Heights, OH (US); Robert C. Ruhl, Cleveland Heights, OH (US)

(73) Assignee: Technology Management, Inc., Cleveland, OH (US)

( * ) Notice: Subject to any disclaimer, the term of this patent is extended or adjusted under 35 U.S.C. 154(b) by 464 days.

This patent is subject to a terminal disclaimer.

(21) Appl. No.: 10/671,902

(22) Filed: Sep. 25, 2003

(65) Prior Publication Data

US 2004/0081875 A1    Apr. 29, 2004

Related U.S. Application Data

(63) Continuation-in-part of application No. 09/992,272, filed on Nov. 14, 2001, now Pat. No. 6,811,913.

(60) Provisional application No. 60/413,858, filed on Sep. 26, 2002, provisional application No. 60/249,098, filed on Nov. 15, 2000.

(51) Int. Cl.
    *H01M 8/10*    (2006.01)
    *H01M 2/02*    (2006.01)
    *C25C 3/00*    (2006.01)

(52) U.S. Cl. .................. 429/30; 429/32; 429/34; 429/38; 205/343

(58) Field of Classification Search .................. 429/30, 429/34, 38, 32, 33, 35, 36, 39, 40; 205/343, 205/334, 345; 204/252, 257, 258, 263, 290.01
See application file for complete search history.

(56) References Cited

U.S. PATENT DOCUMENTS

| | | | | |
|---|---|---|---|---|
| 4,770,955 A | * | 9/1988 | Ruhl | 429/33 |
| 6,365,293 B1 | * | 4/2002 | Isono et al. | 429/30 |
| 6,811,913 B1 | * | 11/2004 | Ruhl | 429/32 |

* cited by examiner

*Primary Examiner*—Raymond Alejandro
(74) *Attorney, Agent, or Firm*—D. Peter Hochberg; Sean Mellino (57) ABSTRACT

An electrochemical system adapted to operate between a fuel cell mode, an electrolysis mode and a mode alternating between an electrolysis mode and a fuel cell mode, also referred to as an energy storage mode, operating on a fuel gas mixture and an oxygen-containing gas mixture, and having modified fuel diffusion layers and oxygen diffusion layers. The tapered fuel diffusion layers are progressively thicker from its outermost edge to its innermost edge. The tapered oxygen diffusion layer is progressively thicker from its innermost edge to its outermost edge.

18 Claims, 4 Drawing Sheets

SOLID OXIDE FUEL CELL STACK ASSEMBLY HAVING TAPERED DIFFUSION LAYERS

CROSS-REFERENCE TO RELATED APPLICATIONS

This application is a continuation-in-part of U.S. patent application Ser. No. 09/992,272, filed on Nov. 14, 2001, now U.S. Pat. No. 6,811,913, which issued on Nov. 2, 2004, which claims the benefit of U.S. Provisional Application Ser. No. 60/249,098, filed on Nov. 15, 2000, and also claims the benefit of U.S. Provisional Application Ser. No. 60/413,858, filed on Sep. 26, 2002.

FIELD OF THE INVENTION

The present invention relates generally to electrochemical systems, such as solid-oxide electrolyte fuel cells and fuel cell assemblies for directly converting chemical energy into electricity. More particularly, the present invention relates to a modified fuel cell system having modified diffusion layers and seals.

DESCRIPTION OF THE PRIOR ART

Planar, or flat, solid oxide fuel cell stacks are well known in the electrochemical industry. Generally, a fuel cell is an electrochemical device that combines a fuel, such as hydrogen, with oxygen to produce electric power, heat and water. The solid oxide fuel cell consists of an anode, a cathode and an electrolyte. The anode and cathode are porous, thereby allowing gases to pass through them. The electrolyte, located between the anode and cathode, is permeable only to oxygen ions as they pass from the cathode to the anode. The passing of the oxygen ions through the electrolyte creates an excess of electrons on the anode side to complete an electrical circuit through an external load to the cathode side, which is electron deficient.

A solid oxide fuel cell is quite advantageous over conventional power generation systems. It is known in the electrochemical industry that such devices are capable of delivering electric power with greater efficiency and lower emissions as compared to engine-generators.

Known planar solid oxide fuel cell stacks utilize a forced flow of gases through their electrodes. Additionally, they employ fuel and airflow designs so that all, or at least many, of the cells are fed the same fuel and air compositions. The stacks are capable of producing good, but not optimal efficiencies. Furthermore, the stacks tend to exhibit significant local flow differences amongst and within cells. This can lead to an increase in stack performance degradation and a reduced stack efficiency. Further still, the stacks may require significant pressure drops, and therefore reduced compression power, for the flowing gases.

Solid oxide electrolyzers are also known, which use input electric power to electrolyze steam into hydrogen and oxygen. Some types of known fuel cell stacks are capable of operation in either the fuel cell or electrolysis modes, while other technologies require separate stacks for fuel cell and electrolysis operation. A combination fuel cell/electrolyzer system can be used for electrical energy storage, using steam, hydrogen, and oxygen.

U.S. Pat. No. 4,770,955 (Ruhl) discloses a hollow planar solid oxide fuel cell employing forced fuel flow through each anode, with all anodes fed essentially the same fuel composition.

U.S. Pat. No. 5,198,310 (Fleming et al.) discloses a process for thermal management by feed gas conditioning in high temperature fuel cell systems wherein at least a portion of a fuel feed stream is chemically reacted in an exothermic chemical reaction in an external zone. The external zone is thermally separated from the fuel cell system and at least a portion of the products of the exothermic chemical reaction are passed to an internal zone in thermal exchange with the fuel cell system and reacted in an endothermic chemical reaction.

U.S. Pat. No. 5,340,664 (Hartvigsen) provides a thermally integrated heat exchange system for solid oxide electrolyte systems, which includes a thermally insulated furnace enclosure structure having an internal chamber therein and a plurality of solid oxide electrolyte plates disposed within the internal chamber.

U.S. Pat. No. 5,492,777 (Isenberg et al.) discloses an electrochemical energy conversion and storage system for storing electrical energy as chemical energy and recovering electrical energy from stored chemical energy. The solid oxide electrolyte electrochemical cell is operated in two modes: an energy storage mode and an energy recovery mode.

U.S. Pat. No. 5,733,675 (Dederer et al.) discloses an electrochemical fuel cell generator having an internal and leak tight hydrocarbon fuel reformer.

European Patent No. 0 466 418 A1 (Ishihara et al.) discloses a solid oxide fuel cell and porous electrode for use with the fuel cell. The use of the porous electrode with the fuel cell improves the surface contact density at the interface while maintaining low resistance to gas diffusion in the electrode, enhancing power output.

International Publication No. WO 03/063286 (Hart et al.) discloses a solid oxide fuel cell comprising two electrodes, an electrolyte, and a plurality of interconnectors arranged to electrically connect the fuel cells in series. The first electrode comprises a first layer on the electrolyte to optimize the electrochemical activity at the electrolyte and a second layer on the first layer to provide electronic conduction perpendicular to the layers of the fuel cell. The second layer is arranged such that electronic conduction perpendicular to the layers of the fuel cell is different at different positions in the second layer, which can be achieved through a different thickness, different composition or different geometry of the second layer at different positions.

U.S. Pat. No. 6,228,521 (Kim et al.) discloses a high density solid oxide fuel cell having a cathode, electrolyte and graded porous anode.

It is known that having a solid oxide fuel cell with diffusion layers being of a constant thickness does not allow for the most optimal gas diffusion efficiencies. It is also known that conventional seals having a conventional thickness are difficult to fabricate with all the desired attributes. Thus, there is an unsatisfied need to have a complete fuel cell system adapted for having a more efficient diffusion of gases through the respective diffusion layers and having thinner seals.

SUMMARY OF THE INVENTION

The present invention is an electrochemical system adapted to allow for more efficient gas diffusion through the gas diffusion layers and more efficient protection against low level gas leakage through the seals.

It is an object of the present invention to provide an overall more efficient electrochemical system.

It is another object of the present invention to provide an electrochemical system adapted to provide a system having better gas diffusion through the multiple gas diffusion layers.

It is yet another object of the present invention to provide an electrochemical system adapted to provide for better protection against low level gas leakage through the annular seals.

It is still yet another object of the present invention to be adaptable to any type of electrochemical system, including multipurpose reversible electrochemical systems and systems adapted for the direct injection of carbonaceous fuels.

It is another object of the present invention to allow for the use of alternative, less expensive materials to be used for the annular seals that are not completely impervious.

It is still yet another object of the present invention to provide an electrochemical system having annular seals being applied by less expensive methods.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Figure 1:
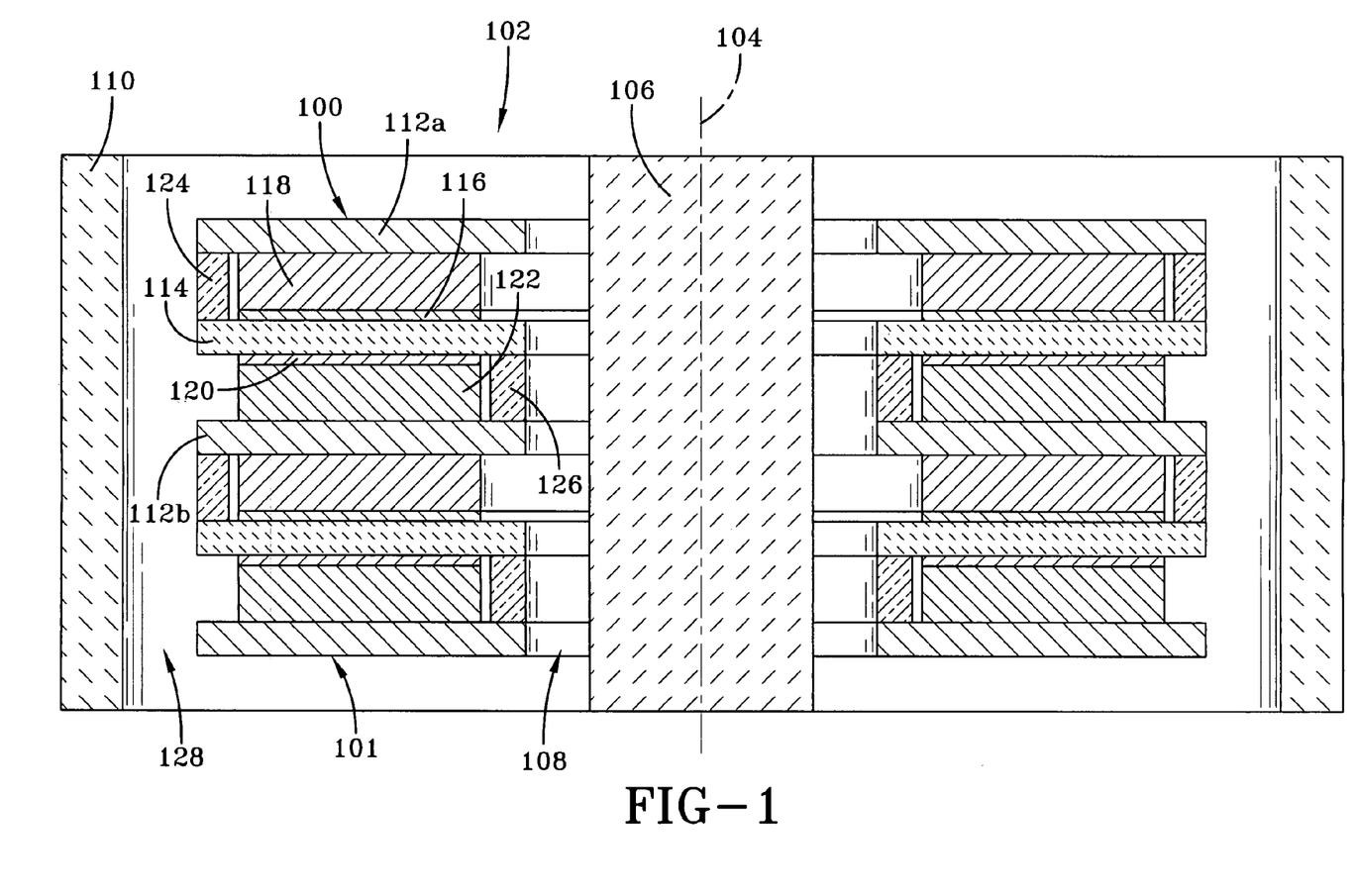
FIG. 1 is cross-section of two adjacent, identical cells contained in a stack of such cells of the system of the present invention.

Referring now to FIG. 1, a cross section showing a single hollow circular cell 100 contained in a stack 102 of like cells of the system of the present invention is shown. It is noted that for purposes of explanation, the present invention is described as being circular; however the system of the present invention may also be employed with electrochemical systems of any shape used in the art, such as rectangular, square, or ovoid. It is also noted that FIG. 1 shows two adjacent cells 100 and 101, one above the other, having like elements. However, for purposes of explanation, stack 102 is referred to as having just one cell 100, but any numbers of cells 100 may be employed in stack 102. A cylinder centerline 104 is also shown. Cells 100 are defined by a hollow cavity in the center of cell 100. In alternative embodiments, the center of cell 100 can be defined by any number of hollow cavities. A center cylinder 106 is located inside stack 102 and defines a hollow cylindrical passage (stack fuel manifold) 108 which is adapted to provide a fuel to electrochemical stack 102 from a fuel source. An oxidizer tube 110 is also adjacent to electrochemical stack 102 to provide a source of oxygen or air to electrochemical stack 102. It should be appreciated that the locations of fuel manifold 108 and oxidizer tube 110 can be switched, with the other components of stack 102 being inverted accordingly. In other words, fuel manifold 108 could also be on the outside of stack 102 and oxidizer tube 110 on the inside. Both center cylinder 106 and oxidizer tube 110 are preferably comprised of a ceramic material, such as mullite, or a high-temperature metal alloy, such as Inconel.

Each cell 100 is separated from and electrically connected to adjacent cells by a separator disc 112. Each cell 100 contains only one separator disc 112 (i.e., 112a, 112b . . . 112n). Specifically, cell 100 includes a separator disc 112a which separates cell 100 from an adjacent cell (not shown) thereabove. A second separator disc 112b, associated with cell 101, separates cell 100 from cell 101. Inside, each cell 100 has an electrolyte disc 114. A fuel electrode 116 abuts electrolyte disc 114 directly above electrolyte disc 114. A fuel diffusion layer 118 is positioned between fuel electrode 116 and separator disc 112a. An oxygen electrode 120 abuts electrolyte disc 114 directly below electrolyte disc 114. An oxygen diffusion layer 122 is positioned between oxygen electrode 120 and separator disc 112b. Both fuel diffusion layer 118 and oxygen diffusion layer 122 are highly porous and sufficiently thick so as to allow the requisite gases to diffuse through them with only moderate composition gradients. It is noted that all components represented in FIG. 1, other than the diffusion layers 118 and 122 of cell 100, are essentially impervious to all gases.

A fuel electrode annular seal 124 surrounds fuel electrode 116 and diffusion layer 118. Fuel electrode annular seal 124 extends from separator disc 112a to electrolyte disc 114. The upper end of fuel electrode annular seal 124 is substantially flush with separator disc 112a. The lower end of fuel electrode annular seal 124 is substantially flush with electrolyte disc 114. An oxygen electrode annular seal 126 is located inside oxygen electrode 120 and oxygen diffusion layer 122. Oxygen electrode annular seal 126 extends from electrolyte disc 114 to separator disc 112b. The upper end of oxygen electrode annular seal 126 is substantially flush with electrolyte disc 114. The lower end of oxygen electrode annular seal 126 is substantially flush with separator disc 112b.

Separator disc 112a can be made of any material common in the art, such as a high-temperature alloy which forms a thin protective oxide surface layer with good high-temperature electrical conductivity. Electrolyte disc 114 may be comprised of yttria-stabilized zirconia, or any other suitable, comparable material. Fuel electrode 116 and fuel diffusion layer 118 can be comprised of, for example, a doped ceria/nickel mixture. Nickel foam may be used for fuel diffusion layer 118 except in cells operating on fuel mixtures with very high oxygen potentials. Oxygen electrode 120 and diffusion layer 122 can be comprised of, for example, strontium-doped lanthanum manganite. Fuel electrode annular seal 124 and oxygen electrode annular seal 126 can be made from a suitable glass. A thin layer of ink, such as an ink made from a finely-divided electrode composition, may be applied on each side of separators disc 112a. The application of ink improves the electrical contact between the components of cell 100.

Between center cylinder or tube 106 and stack 102 is a hollow cylindrical space comprising the stack fuel manifold 108. Between stack 102 and oxidizer tube 110 is a hollow cylindrical space comprising the hot oxidizer manifold 128. The distances between the stack 102 and tubes 106 and 110 are kept small to minimize the distances for gaseous diffusion, but large enough to prevent any physical contact between stack 102 and tubes 106 and 110.

Referring now to stack 102, the plurality of oxygen electrodes 120 can be operated on pure oxygen gas in either an electrolysis mode or an energy storage mode. When pure oxygen gas is employed, the oxygen will flow within the plurality of oxygen diffusion layers 122 due to very slight pressure gradients. When the plurality of oxygen electrodes 120 are being operated on air, oxygen concentration gradients are created within oxygen diffusion layers 122, thus producing gaseous diffusion transport of oxygen. During all modes, fuel gas species concentration gradients are created within fuel diffusion layers 118, thus producing gaseous diffusion transport of the species that are present, such as $H_2$, $H_2O$, $CO$, $CO_2$, or $CH_4$.

During fuel cell mode operation, a current of electrons arrives at oxygen electrode 120 which transfers their charge to oxygen ions. The oxygen ions pass through electrolyte disc 114 (which has good oxygen ion conductivity, but very low electronic conductivity) to fuel electrode 116, which transfers their charge back to electrons, which are conducted to the next cell. The oxygen reacts with fuel species at fuel electrode 116 to produce $H_2O$ and, when carbon is present, $CO_2$. Stack 102 consists of a plurality of series-connected cells 100, thus producing an operating stack voltage which is the sum of all the cell voltages. The same electric current flows through the entire stack.

During electrolysis mode operation, a current of electrons arrives at fuel electrode 116, which transfers their charge to oxygen ions formed by decomposing steam into hydrogen. The oxygen ions pass through electrolyte disc 114 to oxygen electrode 120. Oxygen electrode 120 transfers its charge to electrons and liberates oxygen gas. The electrons are conducted to the next adjacent cell.

During energy storage mode, stack 102 alternates between fuel cell mode (operating on hydrogen fuel and oxygen) and electrolysis mode (producing hydrogen and oxygen from steam).

Fuel manifold 108 and oxygen manifold 128 act to minimize the diffusion distances required for the gas species and to implement the progressive reaction of the gas mixtures by creating "plug flow" of gas from cell to cell along the stack. The progressive reaction of fuel by a large number of cells enables higher stack efficiencies in both fuel cell and electrolysis modes, since each cell can operate at a different voltage based upon the local gas composition (fuel-rich cells at higher voltages). The direction of air flow (when air is being used) may be in either direction relative to fuel flow. In some embodiments, progressive reaction of fuel only is desired, with all cells being exposed to similar oxygen concentrations.

Typically, stack 102 is operated at a temperature between about 600° C. and 1000° C. The preferred thicknesses of fuel diffusion layer 118 and oxygen diffusion layer 122 will depend upon the active electrochemical area per cell and the maximum currents desired: larger areas and larger currents prefer thicker diffusion layers to minimize concentration differences between the inside and outside of the electrodes.

Fuel cell, electrolysis, and energy storage systems may have one or multiple stacks 102. Each stack 102 may have up to hundreds of cells 100, or any particular amount of cells 100 suitable for the particular task of stack 102. Each stack 102 requires electric current contacts on each end and may also optionally have intermediate current taps within stack 102, with the successive sub-stacks between each pair of current taps normally having alternating electrical polarities (orientations). Individual cells 100 or groups of cells 100 may also be fitted with voltage sensing wires to allow monitoring of cells 100 for control purposes. Multiple stacks 102 may be electrically connected in various series and/or parallel combinations for the desired current/voltage characteristics. In systems having multiple stacks 102, the fuel gas stream may be routed to each stack 102 in succession to maximize the advantage of progressive fuel conversion. However, there is usually little benefit in such a routing of air.

Calculations have shown that fuel cell systems of this invention using common hydrocarbon fuels such as propane could theoretically achieve conversion efficiencies (/electric power/propane lower heating value) up to over 80%. Other calculations on steam electrolyzer systems of this invention could theoretically achieve conversion efficiencies (hydrogen higher heating value/electric power) up to over 95%. These efficiencies are higher than those in the prior art.

For energy storage mode operation, the energy storage efficiency may be improved by utilizing thermal energy storage. When a storage system is operated in energy generation (fuel cell) mode, the chemical energy liberated by fuel oxidation exceeds the electrical energy available from the stacks. This excess energy may be stored as hot (e.g., circa 900° C.) thermal energy by allowing stacks 102 and their associated hot components to rise in temperature (for example, by up to 100° C.). In systems where large energy storage capacities are desired, additional hot thermal mass may be added (for example, alumina shapes) in the vicinity of stacks 102. When the storage system is later recharged during electrolysis mode, the required stack electrical energy input is smaller than the chemical energy needed to decompose hot steam. This energy shortfall may be obtained by allowing the temperature of the hot thermal mass to fall. Supplemental electric heaters can ensure that stack 102 temperatures remain above a low set point during very long periods of electrolysis or idling. Similarly, at least some of the thermal energy liberated by cooling the exhaust and condensing the steam produced during fuel cell power generation mode may be stored as moderate temperature (e.g., circa 100° C., depending upon pressure) thermal energy for recovery during electrolysis mode recharging by helping to vaporize liquid water and preheat the feed to the stacks.

Heat balance calculations for systems with thermal storage have shown that solid oxide energy storage systems which employ water condensation could achieve energy storage efficiencies up to at least 80%. Energy storage systems which maintain their water as vapor could achieve energy storage efficiencies up to at least 90%. These efficiencies are higher than the prior art.

Figure 2:
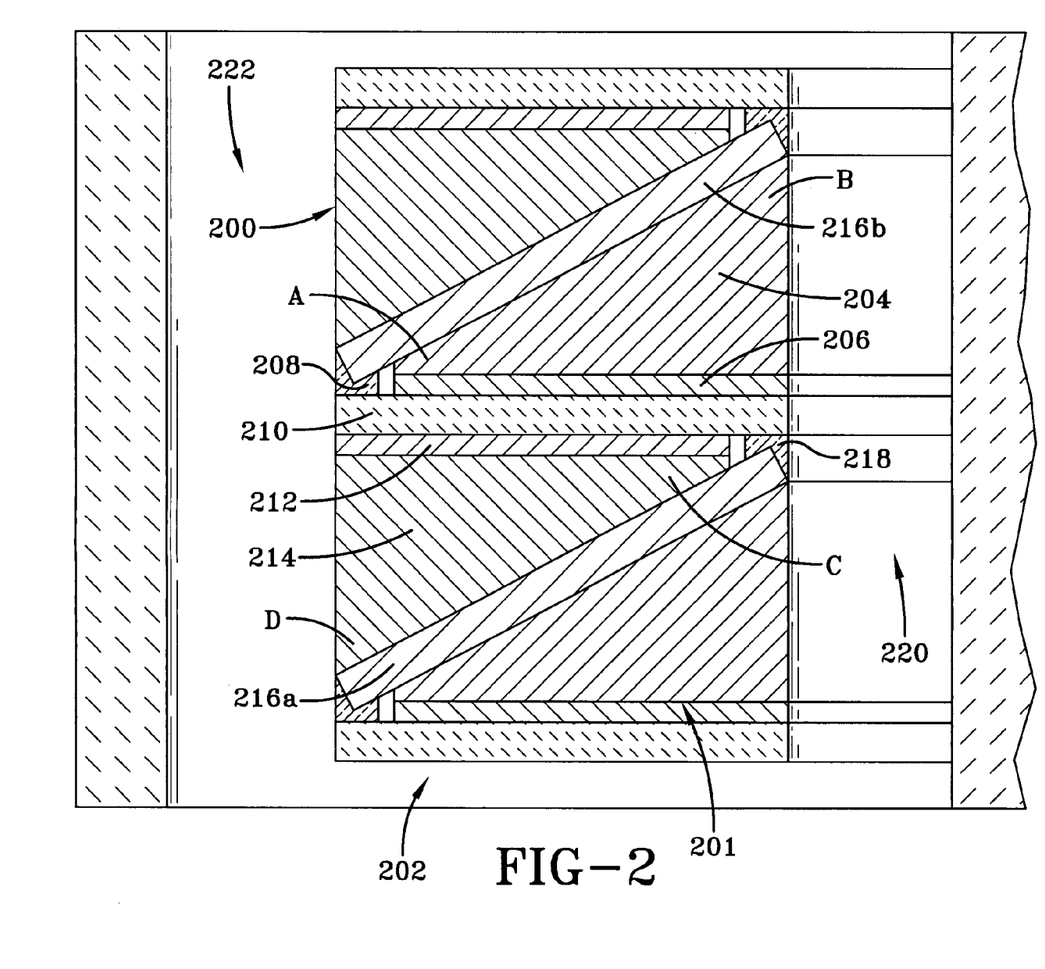
FIG. 2 is a cross section of two cells, contained in a stack of such cells of an alternative embodiment of the solid oxide fuel cell of the present invention.

Referring now to FIG. 2, an alternative embodiment of the present invention is shown and described. In FIG. 2, a cross section of a single hollow circular cell 200 contained in a stack 202 of like cells of the present invention is shown. For purposes of explanation, a cross-section of only a single cell 200 is shown with an adjacent cell 201, however any numbers of cells 200 may be employed in a stack of cells to comprise cell stack assembly 202.

Cell 200 includes essentially the same configuration as the cell 100 described above. However, in this embodiment, cell 200 includes a fuel diffusion layer 204 that is tapered, an anode layer such as a fuel electrode 206, a fuel electrode annular seal 208, an electrolyte disc 210, a cathode layer such as an oxygen electrode 212, an oxygen diffusion layer 214 that is tapered and a separator disc 216a. Each cell 200 contains just one separator disc 216 (i.e., 216a, 216b, ... 216n) which serves to separate cell 200 from an adjacent cell 201, which has its own separator disc (not shown). The aforementioned components are substantially stacked on top of one another so that the bottom of fuel diffusion layer 204 abuts the top of fuel electrode 206 and the top of fuel diffusion layer 204 is in contact with separator disc 216*b*, which is the separator disc associated with an adjacent cell situated above cell 200. The bottom of fuel electrode 206 is in contact with the top of electrolyte disc 210. The bottom of electrolyte disc 210 is in contact with the top of oxygen electrode 212. The bottom of oxygen electrode 212 in turn abuts the top of oxygen diffusion layer 214 which is then in contact with separator disc 216*a*. Of course, the entire stack of cells may be inverted. This would cause each of the aforementioned components to be in contact with its respective adjacent component in the same manner; however in an inverse order as described supra. In this manner, it should be appreciated that the fuel cell stack 202 would function in the exact same manner. An end plate (not shown) is present at each end of the stack 202 of cells 200.

Fuel electrode annular seal 208 surrounds fuel electrode 206 and surrounds a portion of fuel diffusion layer 204. Fuel electrode annular seal 208 extends from separator disc 216*b* to electrolyte disc 210. The bottom end of fuel electrode annular seal 208 is substantially flush with electrolyte disc 210. The upper end of fuel electrode annular seal 208 is in contact with an end and part of the underside of separator disc 216*b*. An oxygen electrode annular seal 218 is located inside oxygen electrode 212 and oxygen diffusion layer 214. Oxygen electrode annular seal 218 extends from electrolyte disc 210 to separator disc 216*a*. The bottom end of oxygen electrode annular seal 218 is in contact with an end and part of the topside of separator disc 216*a* and the upper side of oxygen electrode annular seal 218 is substantially flush with electrolyte disc 210. Electrolyte disc 210 can be made from an impervious yttria-stabilized zirconia, or any other suitable material. Electrolyte disc 210 also need only be substantially impervious to gases and has been found to also serve as a good conductor of oxygen ions. Oxygen diffusion layer 214 can be made of, for example, a highly porous lanthanum strontium manganite and oxygen electrode (cathode layer) 212 can be made of a porous lanthanum strontium manganite plus yttria-stabilized zirconia. Fuel diffusion layer 204 can be made of a highly porous nickel metal and fuel electrode (anode layer) 206 can be made from a porous nickel plus doped ceria. Nickel foam may also be used for fuel diffusion layer 204, except in cells operating on fuel mixtures with very high oxygen potentials. Both fuel diffusion layer 204 and oxygen diffusion layer 214 can alternatively be comprised of any other material conventional in the art of solid oxide fuel cells and having good electronic conductivity. Both fuel electrode annular seal 208 and oxygen electrode annular seal 218 can be made of a glass ceramic. Both fuel diffusion layer 204 and oxygen diffusion layer 214 should be highly porous and sufficiently thick so as to allow the requisite gases to diffuse through easily them with only moderate composition gradients. Fuel electrode (anode) 206 and oxygen electrode (cathode) 212 can also comprise other electrochemically active materials having good electrical conductivity. If either fuel electrode 206 or oxygen electrode 212 has a good mixed (i.e. oxygen ion plus electronic) conductivity, it may require little or no porosity. It is noted that all other components represented in FIG. 3 can be essentially impervious to all gases. It should be appreciated that these aforementioned materials are simply examples and any comparable suitable material may be substituted. A stack fuel manifold or fuel chamber 220 is also present in a hollow interior chamber of cell 200 and a hot oxidizer manifold or air chamber 222 is present surrounding cell 200. As explained in the previous embodiment, fuel chamber 220 (or fuel manifold) can surround cell 200 and air chamber 222 (or oxidixer tube) can be in the hollow interior chamber of cell 200. With this configuration, which effectively inverts stack 202, the remaining components of stack 202 are also inverted so that they remain configured in the same manner relative to chambers 220 and 222. Both of these features are common in conventional solid oxide fuel cell designs, as explained above, and therefore a detailed description thereof is omitted herewith for the sake of brevity.

Separator disc 216 generally separates and electrically connects each cell 200 from an adjacent cell. Separator disc 216 can be made of any material common in the field, preferably a heat resistant metal alloy such as a high-temperature alloy which forms a thin protective oxide surface layer with good high-temperature electrical conductivity. Alternatively, separator disc 216 need only be substantially impervious to the various gases present. A thin layer of ink, such as an ink made from a finely-divided electrode composition, may be applied on each side of separator disc 216. Ink is applied to improve the electrical contact between the components of cell 200.

Figure 3:
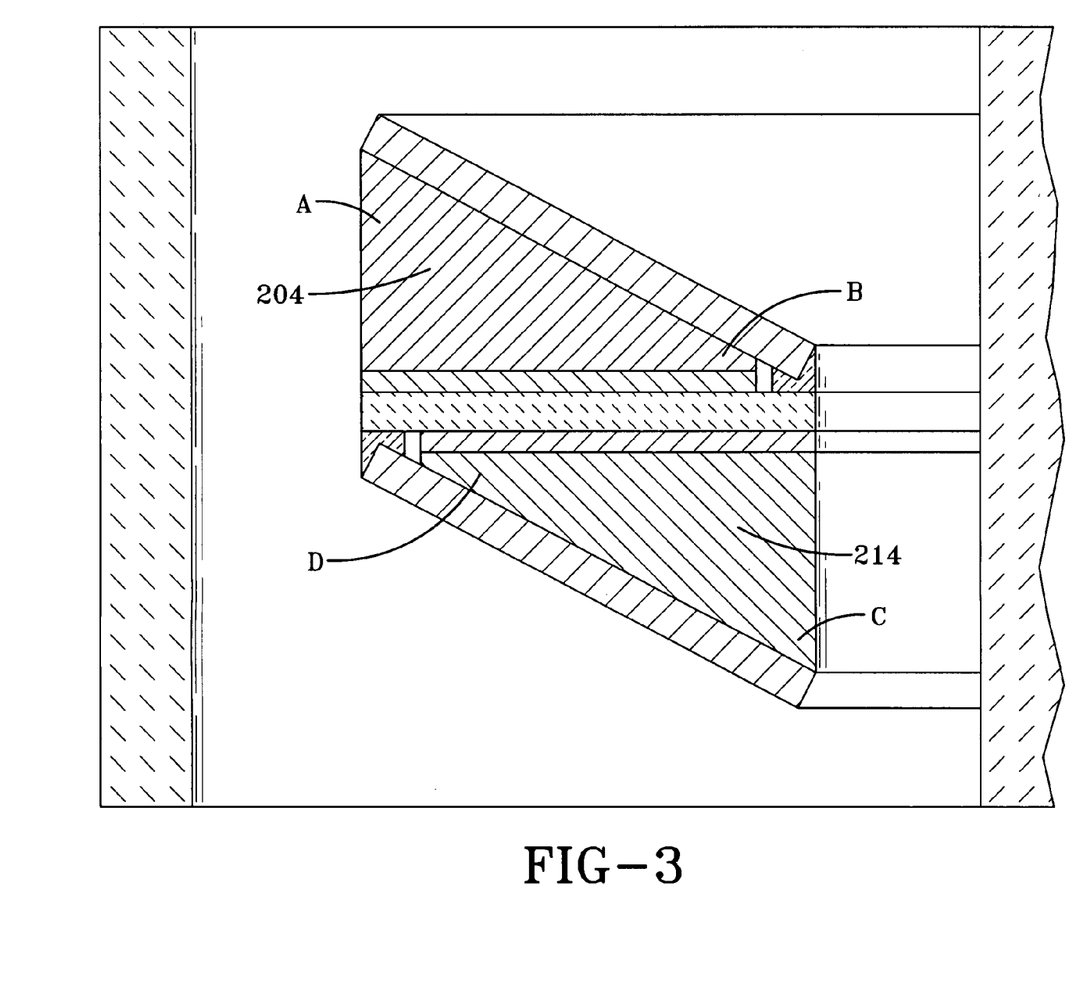
FIG. 3 is a cross-section of two cells, contained in a stack of such cells, of another alternative embodiment of the solid oxide fuel cell of the present invention.

Still referring to FIG. 2, fuel diffusion layer 204 and oxygen diffusion layer 214 are both tapered diffusion layers, as disclosed above. In other words, fuel diffusion layer 204 is relatively thin at its outermost edge or side (point A), which is closest to air chamber 222 and is relatively thick at its innermost edge or side (point B), which is closest to fuel chamber 220. Fuel diffusion layer 204 is tapered so as to become progressively thicker from point A to point B. Oxygen diffusion layer 214 is relatively thin at its innermost edge or side (point C), which is closest to fuel chamber 220 and is relatively thick at its outermost edge or side (point D), which is closest to air chamber 222. Oxygen diffusion layer 214 is tapered so as to become progressively thicker from point C to point D. However, the preferred thicknesses of the respective diffusion layers 204 and 214 will depend upon the electrochemical area per cell and the maximum currents desired: larger areas and larger currents prefer thicker diffusion layers to minimize concentration differences between the inside and outside of the electrodes. Of course, it should be appreciated that fuel diffusion layer 204 and oxygen diffusion layer 214 can have a tapered configuration opposite from that described above. In other words, fuel diffusion layer 204 would be progressively thicker from point A to point B and oxygen diffusion layer would be progressively thinner from point C to point D (FIG. 3). In addition, multiple stacks 202 may be electrically connected in various series and/or parallel combinations to achieve the desired current/voltage characteristics. In systems having multiple stacks 202, the fuel gas stream fed into stack 202 may be routed to each stack 202 in succession in order to maximize the advantage of progressive fuel conversion. However, there is usually little benefit in such a routing of air.

Separator disc 216 has a substantially uniform thickness, is disposed between tapered diffusion layers 204 and 214 and has a substantially conical shape. In other words, separator disc 216 has a dished configuration when seen from its cross section, resembling a Bellville washer. As such, separator disc 216, for example, is angled according to the angle of the progressively increasing thickness of fuel diffusion layer 204. Rather than lying flat, as it would be as described in the aforementioned embodiment, separator disc 216 lies angled upwardly (or downwardly if stack 202 is inverted).

Tapered diffusion layers 204 and 214 provide an advantage over conventional diffusion layers having a constant thickness. Having a tapered configuration provides the greatest cross-sectional area for diffusion of gases where the diffusion mass fluxes are highest, and lower cross-sectional areas for diffusion of gases where the diffusion mass fluxes are lowest. Tapered diffusion layers 204 and 214 thus require smaller total cell thickness for a given current and concentration differences. Any number of cells having tapered diffusion layer 204 and 214 may be employed between alloy end plates (not shown). It is preferred that the outer most diffusion layers have uniform thicknesses rather be tapered as the other diffusion layers.

As explained earlier, fuel electrode annular seal 208 surrounds a portion of fuel diffusion layer 204 and fuel electrode 206 and oxygen electrode annular seal 218 is on the inside of oxygen diffusion layer and oxygen electrode. Conventional seals have thicknesses that are relative to the size of the cell in which the seals are employed, as well as the respective operating conditions. In contrast, fuel electrode annular seal 208 and oxygen electrode annular seal 218 of the present invention have thicknesses that are about 10% than that of conventional seals used in a comparably sized cell with comparable operating conditions. For example, in a cell having given dimensions and operating conditions, standard conventional seals would be about 1–2 mm thick. In the same cell, seals 208 and 218 of the present invention each would be about 0.1–0.2 mm thick. Smaller, thinner seals 208 and 218 facilitate the achievement of low seal leakages. Such modified seals 208 and 218, being smaller and thinner than conventional seals, also provide the advantage of being able to be applied via less expensive methods, such as screen printing.

Figure 4:
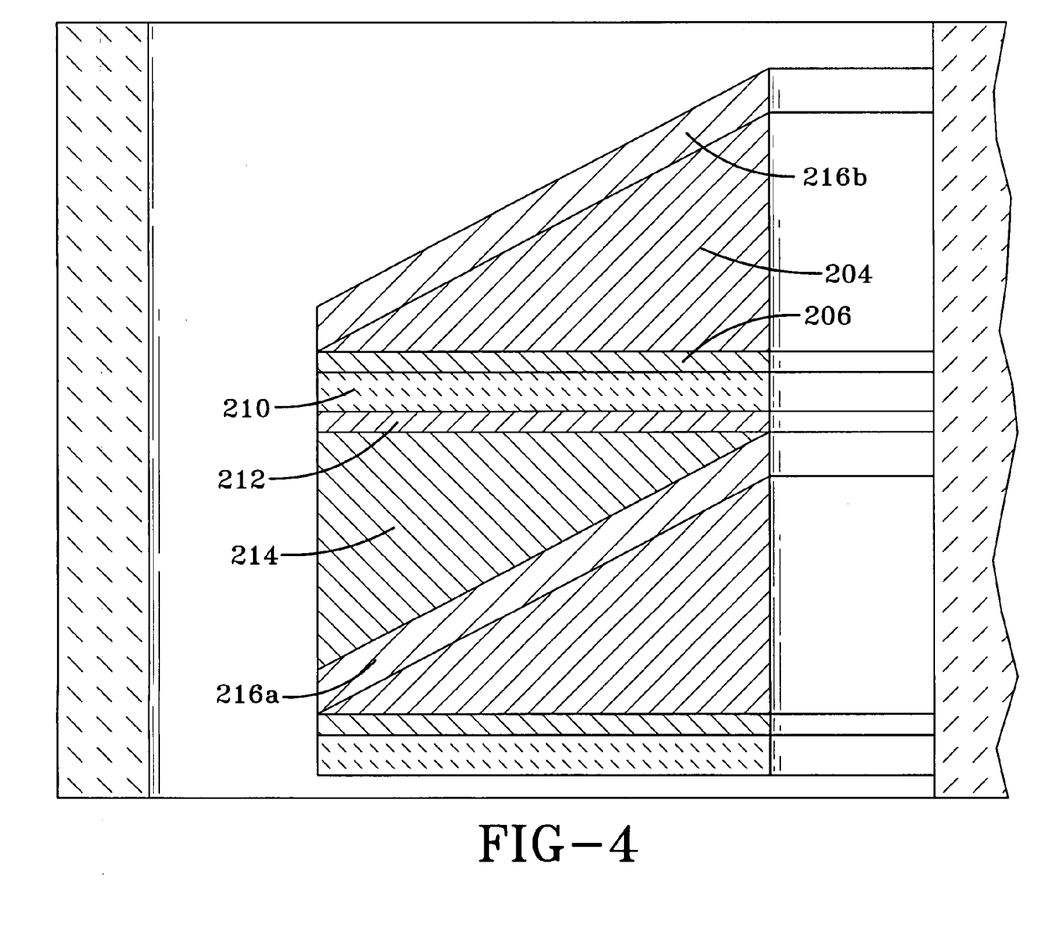
FIG. 4 is a cross-section of two cells, contained in a stack of such cells, of yet another alternative embodiment of the solid oxide fuel cell of the present invention.

Also as stated earlier, seals 208 and 218 generally are composed of a glass-ceramic. However, alternative embodiments of the present invention may employ seals comprising alternative materials which may not be completely impervious. It has been found that gas leakage will be minimized by the generally very small pressure differences between fuel chamber 220 and air chamber 222 and by the small thickness of seals 208 and 218. In yet another alternative embodiment, either or both seals 208 and/or 218 may be eliminated and either oxygen electrode (cathode) 212 and/or fuel electrode (anode) 206 may be extended to also serve as the respective seal (FIG. 4). It has also been found that slow leakage through fuel electrode annular seal 208 (in at least some of the cells in stack 202) may be advantageous as it acts as the necessary fuel exit from fuel chamber 220 and increasing the fuel molecule concentration with fuel diffusion layer 204 and oxygen diffusion layer 214.

Referring now to the operation of cell 200 and stack 202 shown in FIG. 2, stack 202 is generally preheated by a suitable preheating means (not shown) conventional in the art and preheated to a suitable temperature that is sufficiently hot, such as about 850° C. Stack 202 is typically operated between about 600° C. and 1000° C. A gaseous or liquid carbonaceous fuel is introduced into stack 202 via a fuel feed tube (not shown) at a sufficiently high flow rate so that the temperature of the carbonaceous fuel upon exit of stack 202 is low enough to prevent the formation of solid carbon or any other solid deposits to form or be deposited within the fuel feed tube. A typical maximum fuel feed temperature is about 400° C.; however the temperature is fuel-type dependent. Any type of fuel that is conventional in the employment of solid oxide fuel cells may be employed with the present invention. The fuel gas mixture flows through fuel chamber 220 and air flows through air chamber 222. An electric current is generated and flows through stack 202 and an external circuit (not shown). Oxygen molecules diffuse from air chamber 222 into oxygen diffusion layer 214 and oxygen electrode 212 due to gaseous diffusion from an oxygen concentration gradient. In other words, the oxygen molecules diffuse into oxygen diffusion layer 214 and oxygen electrode 212 due to there being a higher concentration of oxygen molecules in air chamber 222 than in oxygen diffusion layer 214 and oxygen electrode 212. At and near the interface between oxygen electrode (cathode) 212 and electrolyte disc 210, the oxygen molecules are ionized into $O^{-2}$ and flow through electrolyte disc 210 due to the chemical potential difference between oxygen electrode (cathode) 212 and fuel electrode (anode) 206. Fuel molecules, such as hydrogen (H2) and carbon monoxide (CO) diffuse from fuel chamber 220 through porous fuel diffusion layer 204 and fuel electrode 206 while oxidation products, such as water ($H_2O$) and carbon dioxide ($CO_2$) diffuse in the opposite direction due to gaseous diffusion from concentration gradients. The fuel molecules are oxidized at or near the interface between fuel electrode (anode) 206 and electrolyte disc 210. This in turn releases electrons which are conducted along stack 202.

It is noted that for purposes of explanation, the present invention is described and shown as being circular, however the system of the present invention may also be employed with electrochemical systems of any shape used in the art, such as polygonal or ovoid. In alternative embodiments, the center of cell 200 can be defined by any number of hollow cavities. In addition, separator disc 216 may have its edges shaped to modify its surfaces being sealed. Separator disc 216 may also have a shape other than conical as long as the greater thickness of each respective diffusion layer 204 and 214 is adjacent to the associated respective chamber 220 and 222.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. It would be evident to one familiar with the art that the cells of the system of the present invention need not be identical. The object of the present invention may be performed with a system not having like cells, or cells of varying thicknesses in a single system or even comprising varying materials in a single system. Accordingly, the present invention is intended to embrace all such alterations, combinations, modifications, and variations that fall within the spirit and scope of the appended claims.

What is claimed is:

1. An electrochemical system adapted to operate between a fuel cell mode, an electrolysis mode, and a mode alternating between said electrolysis mode and said fuel cell mode operating on a fuel gas mixture and an oxygen-containing gas mixture, said system comprising:

at least one hollow planar cell arranged to form an electrochemical stack, said stack including an electrical contact structure at each end of said stack, said hollow cell defining a central chamber therein and wherein said cell comprises:

a hollow planar, substantially impervious, electrolyte within each cell;

a hollow planar fuel electrode having an outermost edge and an innermost edge and contacting said electrolyte, said fuel electrode being on one side of the electrolyte;

a hollow planar oxygen electrode contacting said electrolyte on the opposite side of said electrolyte from said fuel electrode and having an outermost edge and an innermost edge;

an electronically conductive tapered fuel diffusion layer contacting said fuel electrode and having an innermost edge, an outermost edge, a planar side and a tapered side, wherein said tapered fuel diffusion layer allows fuel and oxidized fuel transport via gaseous diffusion between said tapered fuel diffusion layer and said fuel electrode, said tapered fuel diffusion layer having a configuration being progressively thicker from either said innermost edge to said outermost edge or from said outermost edge to said innermost edge;

an electronically conductive tapered oxygen diffusion layer contacting said oxygen electrode and having an innermost edge, an outermost edge, a planar side and a tapered side, wherein said oxygen diffusion layer allows oxygen transport via gaseous diffusion between said tapered oxygen diffusion layer and said oxygen electrode, said tapered oxygen diffusion layer having a configuration being thicker from either said innermost edge to said outermost edge or from said outermost edge to said innermost edge;

an electronically conductive, substantially impervious, hollow planar separator for separating each cell from an adjacent cell within said stack and electrically connecting each cell to an adjacent cell, said separator being in contact with and disposed between said tapered side of said tapered fuel diffusion layer and said tapered side of said tapered oxygen diffusion layer;

a first annular seal surrounding the outermost side of said fuel electrode and said tapered fuel diffusion layer, thereby preventing said oxygen-containing gas mixture from accessing said fuel electrode and said tapered fuel diffusion layer;

a second annular seal surrounding the innermost side of said oxygen electrode and said tapered oxygen diffusion layer, thereby preventing said fuel gas mixture from accessing said oxygen electrode and said oxygen diffusion layer;

a fuel chamber for providing a fuel source to said system, said fuel chamber able to communicate with said system; and an air chamber for providing an oxygen source to said system, said air chamber able to communicate with said system, wherein one of said fuel chamber and said air chamber is provided in said central chamber and the other is provided surrounding said system.

2. The electrochemical system according to claim 1 wherein said tapered fuel diffusion layer is tapered in the opposite direction of said tapered oxygen diffusion layer.

3. An electrochemical system of claim 1 wherein said oxygen-containing gas mixture is substantially pure oxygen.

4. The electrochemical system of claim 1 wherein said at least one cell has a shape selected from the group consisting of circular, square, rectangular and oval.

5. The electrochemical system of claim 1 wherein said fuel gas mixture comprises steam and hydrogen in each of said modes.

6. The electrochemical system of claim 1 wherein said at least one hollow planar cell is defined by at least one cavity.

7. The electrochemical system of claim 1 and further including an additional electrical contact layer applied to at least one side of said separator to improve the electrical contact between the components of said at least one cell.

8. The electrochemical system of claim 7 wherein said additional electrical contact layer is ink comprising finely-divided electrode composition.

9. The electrochemical system of claim 1 wherein said fuel gas mixture flows past each cell substantially in succession thereby performing progressive reaction of said fuel gas mixture and enabling higher conversion efficiency.

10. A solid-oxide fuel cell system adapted to operate on a fuel gas mixture and an oxygen-containing gas mixture, said system comprising:

at least one hollow planar cell arranged to form an electrochemical stack, said stack including an electrical contact structure at each end of said stack, said cell defining a central chamber therein and wherein said cell comprises:

a hollow planar, substantially impervious, electrolyte within each cell;

a hollow planar fuel electrode having an outermost edge and an innermost edge and contacting said electrolyte, said fuel electrode being on one side of the electrolyte;

a hollow planar oxygen electrode contacting said electrolyte on the opposite side of said electrolyte from said fuel electrode and having an outermost edge and an innermost edge;

an electronically conductive tapered fuel diffusion layer contacting said fuel electrode and having an innermost edge, an outermost edge, a planar side and a tapered side, wherein said tapered fuel diffusion layer allows fuel and oxidized fuel transport via gaseous diffusion between said tapered fuel diffusion layer and said fuel electrode, said tapered fuel diffusion layer having a configuration being progressively thicker from either said innermost edge to said outermost edge or from said outermost edge to said innermost edge;

an electronically conductive tapered oxygen diffusion layer contacting said oxygen electrode and having an innermost edge, an outermost edge, a planar side and a tapered side, wherein said oxygen diffusion layer allows oxygen transport via gaseous diffusion between said tapered oxygen diffusion layer and said oxygen electrode, said tapered oxygen diffusion layer having a configuration being thicker from either said innermost edge to said outermost edge or from said outermost edge to said innermost edge;

an electronically conductive, substantially impervious, hollow planar separator for separating each cell from an adjacent cell within said stack and electrically connecting each cell to an adjacent cell, said separator being in contact with and disposed between said tapered side of said tapered fuel diffusion layer and said tapered side of said tapered oxygen diffusion layer;

a first annular seal surrounding the outermost side of said fuel electrode and said tapered fuel diffusion layer, thereby preventing said oxygen-containing gas mixture from accessing said fuel electrode and said tapered fuel diffusion layer; and a second annular seal surrounding the innermost side of said oxygen electrode and said tapered oxygen diffusion layer, thereby preventing said fuel gas mixture from accessing said oxygen electrode and said oxygen diffusion layer;

a fuel chamber for providing a fuel source to said system, said fuel chamber able to communicate with said system; and an air chamber for providing an oxygen source to said system, said air chamber able to communicate with said system, wherein one of said fuel chamber and said air chamber is provided in said central chamber and the other is provided surrounding said system.

11. The electrochemical system according to claim 10 wherein said tapered fuel diffusion layer is tapered in the opposite direction of said tapered oxygen diffusion layer.

12. The fuel cell system of claim 10 wherein said at least one cell has a shape selected from the group consisting of circular, square, rectangular and oval.

13. The fuel cell system of claim 10 further including an additional electrical contact layer applied to at least one side of said separator to improve the electrical contact between the components of said at least one cell.

14. The fuel cell system of claim 13 wherein said additional electrical contact layer is ink comprising finely-divided electrode composition.

15. The fuel cell system of claim 10 wherein said fuel gas mixture flows past each cell substantially in succession thereby performing progressive oxidation of said fuel gas mixture and enabling higher conversion efficiency.

16. A solid-oxide fuel cell system adapted to operate on a fuel gas mixture and an oxygen-containing gas mixture, said system comprising:

at least one hollow planar cell arranged to form an electrochemical stack, said stack including an electrical contact structure at each end of said stack;

a hollow planar, substantially impervious, electrolyte within each cell;

a hollow planar fuel electrode having an outermost edge and an innermost edge and contacting said electrolyte, said fuel electrode being on one side of the electrolyte;

a hollow planar oxygen electrode contacting said electrolyte on the opposite side of said electrolyte from said fuel electrode and having an outermost edge and an innermost edge;

an electronically conductive tapered fuel diffusion layer contacting said fuel electrode and having an innermost edge, an outermost edge, a planar side and a tapered side, wherein said tapered fuel diffusion layer allows fuel and oxidized fuel transport via gaseous diffusion between said tapered fuel diffusion layer and said fuel electrode, said tapered fuel diffusion layer having a configuration being progressively thicker from either said innermost edge to said outermost edge or from said outermost edge to said innermost edge;

an electronically conductive tapered oxygen diffusion layer contacting said oxygen electrode and having an innermost edge, an outermost edge, a planar side and a tapered side, wherein said oxygen diffusion layer allows oxygen transport via gaseous diffusion between said tapered oxygen diffusion layer and said oxygen electrode, said tapered oxygen diffusion layer having a configuration being thicker from either said innermost edge to said outermost edge or from said outermost edge to said innermost edge; and an electronically conductive, substantially impervious, hollow planar separator for separating each cell from an adjacent cell within said stack and electrically connecting each cell to an adjacent cell, said separator being in contact with and disposed between said tapered side of said tapered fuel diffusion layer and said tapered side of said tapered oxygen diffusion layer.

17. The solid-oxide fuel cell system according to claim 16 and further including a first annular seal surrounding the outermost edge of said fuel electrode and said tapered fuel diffusion layer, thereby preventing said oxygen-containing gas mixture from accessing said fuel electrode and said tapered fuel diffusion layer.

18. The solid-oxide fuel cell system according to claim 17 and further including a second annular seal surrounding the innermost edge of said oxygen electrode and said tapered oxygen diffusion layer, thereby preventing said fuel gas mixture from accessing said oxygen electrode and said oxygen diffusion layer.

* * * * *